United States Patent [19]

Kelling

[11] 3,729,623

[45] Apr. 24, 1973

[54] METHOD FOR THE SELECTIVE MULTIPLICATION AND DIVISION OF A PULSE TRAIN AND A MULTIPLY/DIVIDE CIRCUIT THEREFOR

[75] Inventor: Leroy U. C. Kelling, Waynesboro, Va.

[73] Assignee: General Electric Company, Lynn, Mass.

[22] Filed: Jan. 11, 1971

[21] Appl. No.: 105,365

[52] U.S. Cl. ............... 235/151.11, 318/603, 318/39, 307/225, 328/63

[51] Int. Cl. ............... H03k 3/64

[58] Field of Search ............... 235/150.3; 318/603, 318/39; 307/225; 328/63

[56] References Cited

UNITED STATES PATENTS 3,254,203 5/1966 Kveim ............... 235/151.11 X

*Primary Examiner*—Eugene G. Botz
*Attorney*—William S. Wolfe, Frank L. Neuhauser, Oscar B. Waddell and Joseph B. Forman

[57] ABSTRACT

Numbers stored in a multiplier register and a divisor register are selectively gated to an accumulator via an adder/subtracter. The gating is effective to subtract the number in the multiplier register from that in the accumulator register each time an input pulse appears. When the number in the accumulator register falls below a predetermined level, the number in the divisor register is added thereto and an output pulse is produced.

12 Claims, 2 Drawing Figures

*INVENTOR.*
LEROY U.C. KELLING

METHOD FOR THE SELECTIVE MULTIPLICATION AND DIVISION OF A PULSE TRAIN AND A MULTIPLY/DIVIDE CIRCUIT THEREFOR

BACKGROUND OF THE INVENTION

1. Field of the Invention

This invention relates to pulse multiplication and division circuits; more particularly, it relates to method and circuitry for producing a number of output pulses related to a train of input pulses in accordance with the ratio of first and second quantities.

2. Description of the Prior Art

There are a number of circuits and techniques for converting an incoming pulse rain into an outgoing pulse train having some other repetition rate. These techniques vary from the selective triggering of a higher frequency oscillator with each input pulse of a lower repetition rate pulse train, to the operation of a counter wherein the output is selected from particular stages. Circuits of this type are employed in diverse computer operations. One area of use, having particular interest at the present time, is in connection with automatic machine tool control systems. In the following disclosure of this invention, reference is made to the control over a turning machine or lathe wherein the toolpiece is advanced toward a rotating workpiece in order to reduce the radius thereof.

The presently known "pulse rate mutliplier" effects fractional pulse rate multiplication in response to an input clock pulse frequency and produces a pulse rate which is a fraction of the clock frequency. Actually, such pulse rate multipliers might be considered to be pulse train dividers. A pulse rate multiplier comprises a counter, logic gates, and a storage register. The input pulses are counted and divided into a series of non-coincident pulse trains of different pulse rates, some of which are combined into an output pulse train in response to elements of the command number stored in the storage register. The output pulse rate is thus equal to the product of the input rate and the command number, divided by a number equal to the counter capacity.

Another circuit for effecting pulse rate multiplication and/or division, is the zig-zag function generator. The zig-zag function generator contains two integrand registers and one remainder register. For each integrate input command, the zig-zag function generator either adds the one integrand number or subtracts the other integrand number from the number in the remainder register. As long as the magnitude of the number in the remainder register stays negative, the generator continues adding the first of said integrand numbers at each integrate command. For each of these integrations, a pulse is emitted on a first path. When the number in the remainder register is positive, the second integrand number is subtracted for each integrate command until the number in the remainder register again becomes negative. For each of these subtractions, a single pulse is emitted on a second path. The net result of the zig-zag integration process is the production of an output pulse for each integrate command on one of two paths and the ratio of these two pulse streams is determined by the magnitude of the two integrand numbers. In the zig-zag function generator, the pulse repetition rate of the sum of the output pulses is constant and not subject to changes of the magnitude of the two integrand numbers. Only the ratio of the pulse frequency on the two paths is affected by the magnitude of these numbers.

A still further pulse rate division arrangement is available wherein clock pulses are entered into a decimal counter having a plurality of decade counting stages arranged in descending order. The decade into which the clock pulses are inserted is considered the highest order decade and the subsequent decade stages are actuated by carry-over pulses in a descending decade order. Each decade has a plurality of buses associated therewith. A premixer is provided for actuating associated buses of each decade with different count outputs from that decade and functions so that when a decase cycles through a ten count, any number of pulses from one through nine may be derived from the associated bus lines. The buses are then connected to apparatus called a bus selector which is actuated by a digit in a corresponding digit position of a control number to provide as its output an equivalent number of pulses. The output pulses are applied to a smoothing counter having an output consisting of a train of uniformly spaced pulses.

BRIEF SUMMARY OF THE INVENTION

As compared to the prior art, the present invention permits much higher output pulse rates relative to a fixed input pulse rate for large numbers. It can be used as a fractional computer and it permits pulse rate division combined with rescaling to produce a high output pulse rate in a manner not previously possible. As illustrated in the embodiment described hereinafter, the present invention may be of particular value in conjunction with adaptive control systems wherein a constant surface cutting speed on a turning machine is to be maintained as the radius of cutting changes.

It is an object of the present invention to provide an improved method for deriving a number of output pulses related to an input pulse train in accordance with the ratio of first and second quantities.

It is another object of the invention to provide an improved pulse rate multiplication circuit.

It is also another object of the invention to provide an improved pulse rate division circuit.

It is a further object of the invention to provide a pulse rate multiply/divide circuit yielding a high output pulse rate relative to fixed input pulse rate for large numbers.

Still further, it is an object of the present invention to provide an improved pulse rate multiply/divide circuit useful in conjunction with controlling turning machines in order to maintain constant surface cutting speeds thereon.

In accordance with one aspect of the invention, there is provided a method of producing a number of output pulses related to an input pulse train in accordance with the ratio of first and second quantities, comprising establishing a third quantity; subtracting the first quantity from the third quantity upon occurrence of each input pulse, and then changing the third quantity to correspond to the remainder; adding the second quantity to the third quantity when the third quantity is below a predetermined value and then changing the third quantity to correspond to the sum; and producing an output pulse each time the third quantity is below the mentioned predetermined value.

In accordance with another aspect of the invention, there is provided a pulse rate multiply/divide circuit comprising a divisor register, a multiplier register, and an accumulator register, said registers being interconnected by logic gates and suitably operated in response to clock pulses and controlling input pulses to produce an output pulse train having a pulse repetition rate equivalent to the product of the input pulse rate times the number appearing in the multiplier register and divided by the number appearing in the divisor register.

The above objects of the invention, along with further objects and outstanding features, will be apparent from the following detailed description of a preferred embodiment which will be illustrated and explained in conjunction with the attached drawings.

DETAILED DESCRIPTION OF THE PREFERRED EMBODIMENT

Figure 1:
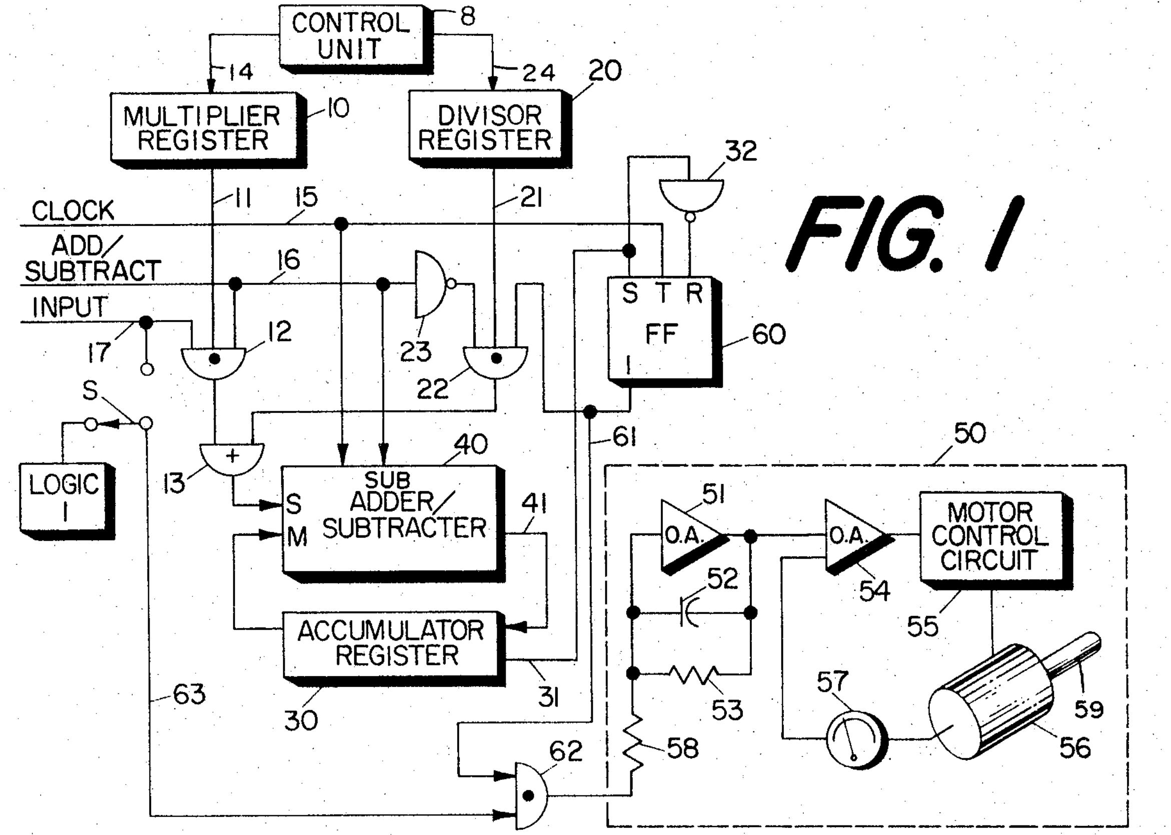
FIG. 1 is a logic schematic of a pulse rate multiply/divide circuit in accordance with the present invention, as employed in conjunction with a motor control circuit for controlling the cutting rate on a turning machine such as a lathe.

FIG. 1 is a logic schematic of the present invention as might be used in numerical control equipment for controlling the cutting rate of a lathe. The initial discussion assumes that the switch S is in the logic 1 position. Three basic registers are illustrated in FIG. 1. In a typical numerical control equipment, program commands for the motor control circuit are stored on a paper tape. A control unit 8, which includes a paper tape reader, extracts the commands from the paper tape and routes the appropriate control numbers into multiplier register 10 and divisor register 20. The multiplier register 10 and divisor register 20 may be, for example, binary-coded decimal registers adapted by means of input leads 14 and 24, respectively, to store numbers of any desired magnitude. Each register provides an output at lead 11 or 21, respectively, representative of the number stored therein. The accumulator register 30 is operative in combination with an adder/subtracter 40 in order to accumulate the numbers appearing in the multiplier and divisor registers in accordance with the criteria established by the logic circuitry interposed therebetween.

The addition/subtraction operations may be performed either in parallel, in which all bit levels are simultaneously added, or in serial fashion in which each bit level is added in sequence in order of increasing significance. The particular circuitry utilized to develop the combined adder/subtracter and accumulator register is not germane to the invention. As an example of the type of circuitry available, the reader is referred to FIG. 4–13 on page 101 of the publication "Arithmetic Operations in Digital Computers," published in 1955 by Van Nostrand, and written by R. K. Richards. This figure is an example of a parallel binary accumulator. Attention is also directed to FIG. 4–30 on page 129 of the cited publication, as an example of the connection of a full adder with a carry delay to process serial data wherein one of the inputs and the outputs are connected to a serial accumulator register.

The output of multiplier register 10 is connected to the subtrahend input of adder/subtracter 40 via AND gate 12 and OR gate 13. The output of divisor register 20 is similarly connected to the subtrahend input of adder/subtracter 40 via a separate AND gate 22 and the same OR gate 13. As a result of this arrangement, the subtrahend input receives a number equivalent to either the multiplier register number or the divisor register number, in accordance with the coincident occurrence of particular conditions explained hereinafter. A further input to AND gates 12 and 22 is obtained from an add/subtract pulse train which may consist of evenly spaced binary signals on lead 16 representative of sequentially occurring subtract or add control signals. The nature of the add/subtract pulse train may be seen from the waveform 160 in FIG. 2 which has been identified on the left. An inverter 23 is interposed between the lead 16 and the input to AND gate 22 and thus this input is enabled during the off period of the add/subtract signal, whereas the input to AND gate 12 is enabled during the on period of the add/subtract signal.

A further important element of FIG. 1 is the flip-flop 60. This is a conventional element having input terminals designated S, R, and T, and an output terminal designated 1. The flip-flop is "set" by an application of a clock pulse to the T terminal after a signal has been applied to the set steering terminal S. The flip-flop is "reset" by application of a clock pulse to the T terminal after a signal has been applied to the reset steering terminal R. When "set," a logic one signal appears at the 1 output terminal. When "reset," a logic zero signal appears at the 1 output terminal.

The entire circuit is synchronized by clock pulses delivered over lead 15 to both adder/subtracter 40 and flip-flop 60. In accordance with usual operation, the clock pulses act as triggers to the respective circuits. A clock pulse train is illustrated by waveform 150 in FIG. 2. The input signal is applied via lead 17 to one input of AND gate 12 and the output signal is extracted from the 1 output terminal of flip-flop 60 over lead 61. These signals are illustrated by waveforms 170 and 610, respectively, in FIG. 2.

The output circuit 50 is a schematic illustration of an adaptive control arrangement suitable for controlling the motor of a lathe, or the like. The typical components appearing in such a control circuit will be briefly described following a description of a typical operating cycle of the pulse rate multiply/divide circuit.

The method of effecting modification of an input pulse rate in accordance with the ratio between two quantities may be briefly explained by reference to waveform 300 in FIG. 2. This waveform represents the number registered in accumulator register 30 at succeeding instants in time. The ordinate of the illustrated waveform is calibrated in the numerical value registered and the abscissa is time.

If it is assumed that the operating ratio to be employed is 25,000 to 60,000, these numbers would be stored in multiplier register 10 and divisor register 20, respectively. It will also be assumed that accumulator register 30 has the number 60,000 registered therein at the beginning of the period being considered.

Upon occurrence of an input pulse, 25,000 is subtracted from the number in the accumulator register. The remainder is then entered as a new number in the accumulator register. To illustrate this, the waveform 300 begins at a level 301 representing storage of 60,000 and thereafter a dotted line descends to a level 302 representing storage of 35,000. The transition is illustrated in dotted line because the particular method of insertion and extraction of the numbers is irrelevant. Upon occurrence of the next input pulse, 25,000 is subtracted from the new 35,000 figure and this is illustrated by the new level 303 representing storage of 10,000. Upon occurrence of the next input pulse, 25,000 is subtracted from the new 10,000 figure and this is illustrated by the new level 304 representing storage of −15,000.

Each time the stored number descends below zero, an output pulse is produced and 60,000 is added. Thus, the number in the accumulator register ascends to a level 305 representing 45,000 during the interval before arrival of the next input pulse. When this next input pulse arrives, 25,000 is again subtracted and the level 306 representing storage of 20,000 is attained. This cycle of operation continues and output pulses are accordingly produced at a rate corresponding to the ratio between the numbers in the multiplier and divisor registers times the input pulse rate. Quite clearly, reference has been made to the particular registers shown in FIG. 1; however, the method of implementing the described arithmetic operations may be performed by other circuitry.

Specific attention is directed to the circuitry of FIG. 1 and the manner in which it implements the described method.

Figure 2:
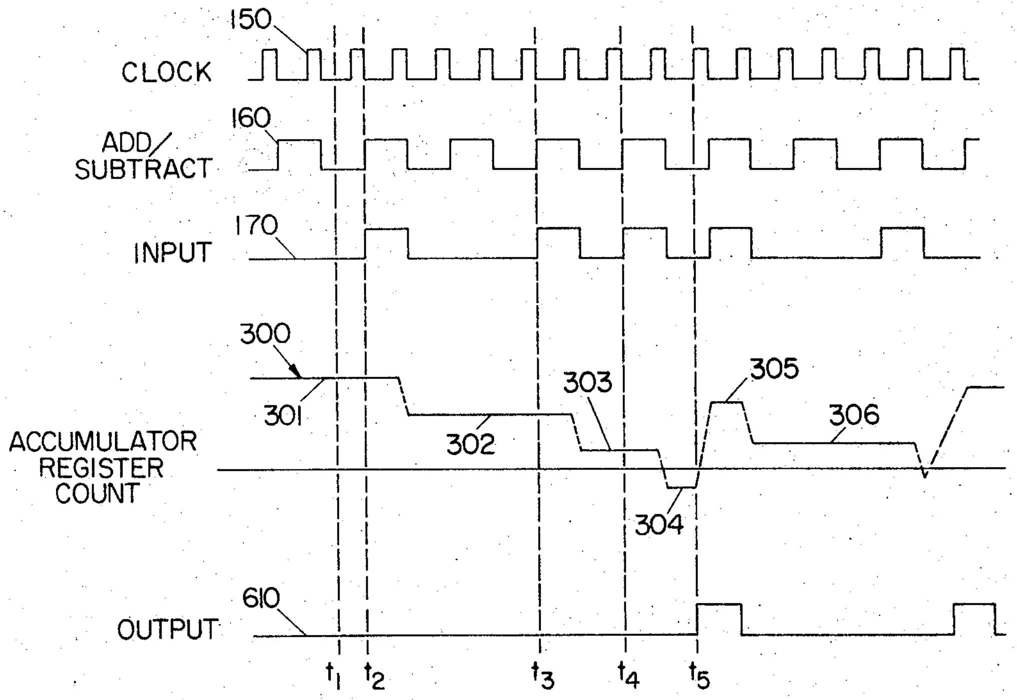
FIG. 2 comprises a plurality of waveforms displayed as a function of time, each waveform representing either strategic signal conditions or states of particular elements shown in FIG. 1.

Each of the three leads 15, 16 and 17 contains signals of the nature illustrated in the first three waveforms of FIG. 2. Thus, the clock pulses 150 appearing on lead 15 are of relatively short duration and appear at a fixed repetition rate. The add/subtract signals 160 on lead 16 are also of constant duration. This signal is a rectangular waveform wherein the upper level, or on portion, is indicative of a subtract command and the lower level, or off portion, is indicative of an add command. The input pulse train 170 need not have a constant repetition rate. In fact, in the control of machine tools, it is often the case that the pulse rate of an input control pulse is not constant. Rather, the rate is indicative of the rate at which the machine is to move generally and the phase positioning of the pulses may include critical command information. Thus, the input pulse train 170 is illustrated as a binary signal of variable repetition rate.

All of the waveforms in FIG. 2 share a common abscissa calibrated in time and thus we can consider sequential circuit operation as time progresses.

At time $t_1$, neither AND gate 12 nor AND gate 22 is enabled because the input pulse train 170 and the output signal 610 are both at a logical zero level.

At time $t_2$, the input signal 170 and the ADD/SUBTRACT signal 160 at AND gate 12 are both at a logical one level accordingly, the number registered in multiplier register 10 is passed therethrough via OR gate 13 to the subtrahend input S of adder/subtracter 40. The minuend input M of the adder/subtracter receives the number registered in accumulator register 30. The presence of the subtract command at terminal SUB of adder/subtracter 40 is effective to establish the subtraction operating mode. Recalling the assumptions relative to the numbers stored, it will be apparent that when the next clock pulse occurs, the adder/subtracter will generate the remainder 35,000. This is then stored in accumulator register 30 via lead 41.

At time $t_3$, AND gate 12 again initiates a subtract cycle and upon occurrence of the next clock pulse adder/subtracter 40 will generate the remainder 10,000, which is subsequently stored in accumulator register 30.

At time $t_4$, the above-described sequence of events results in the generation and storage of the negative remainder −15,000.

Accumulator register 30 is adapted to produce an output signal whenever it registers a negative value. Thus, this signal is applied over lead 31 to the set steering input of flip-flop 60. Upon occurrence of the next clock pulse at time $t_5$, flip-flop 60 is set and produces an output that is applied to AND gate 22. Since the add/subtract signal is in the "add" condition at this time, inverter 23 is effective to enable the other input of AND gate 22 and the number in divisor register 20 is applied via OR gate 13 to the subtrahend input of adder/subtracter 40. Thus, when the next clock pulse occurs, 60,000 is added to accumulated number of −15,000 and the new sum of 45,000 is generated for storage in accumulator register 30.

The change on lead 31 when the accumulator register goes positive is applied as a reset steering signal to flip-flop 60 via inverter 32. When the next clock pulse occurs, flip-flop 60 is reset and the output is removed.

As the above-described cycle of events continues, it will be seen that output pulses are generated on lead 61 which have the desired repetition rate.

It is contemplated that appropriate units will be employed for the multiplier and divisor registers such that the numbers stored therein may be either changing or fixed. Furthermore, with the type of add/subtract waveform described, the divisor must be greater than the multiplier because there is provision for only one add cycle between the input subtract cycles. One may easily change the timing to permit more than one add cycle and then the output pulse rate will be higher than that of the input. For example, if the potential add cycles are increased to span four clock periods, the multiplier register can store numbers up to four times greater than those stored in the divisor register and up to four output pulses per input pulse can be generated.

Having explained the manner in which the pulse rate multiplier/divider circuit operates, it is now of value to consider the manner in which this circuitry may be employed in conjunction with the control of the spindle speed of a turning machine, or lathe. In FIG. 1, the output from flip-flop 60 on lead 61 is applied through operational amplifiers 51 and 54 to a motor control circuit 55. The output 610 of flip-flop 60 is in the form of a recurrent series of voltage pulses each of which applies a voltage pulse of a fixed voltage and fixed time duration to the input of the operational amplifier 51 through resistor 58. The recurrence rate of these pulses is a function of the input pulse rate 17 and the quotient of the magnitudes of the numbers in the multiplier and divisor registers. Operational amplifier 51 is provided with feedback capacitor 52 and impedance 53 and operates to integrate and amplify the pulses applied thereto. The analog signal from operational amplifier 51 serves as an input to operational amplifier 54 which is connected in a servo loop with the motor control circuitry 55, the spindle turning motor 56, and a tachometer 57, in order to control the speed of the motor 56 and, therefore, the speed of a spindle 59 driven by the motor 56. This arrangement is suitable for controlling the spindle speed of a lathe, or other turning machine, wherein the resultant spindle speed is a function of the input pulse rate 17, the number in multiplier register 10, the number in divisor register 20, and the gain of the spindle drive output circuit 50. There are several possible variations in this control circuit depending upon the point of insertion of the commands and the nature of the commands. Spindle speed commands may be in revolutions per minute or in surface feet per minute of cutting speed. In the latter case, the associated control must monitor the effective cutting radius, i.e., the distance from the cutting tip of the cutting tool to the center of rotation of the turning workpiece.

If the input pulse 17 has a constant pulse rate, this control may be operated in a constant surface feet per minute mode wherein the resultant spindle speed in rpm is directly proportional to the surface feet per minute command number inserted in the multiplier register and inversely proportional to the cutting radius number inserted in the divisor register. Then, as the cutting radius changes during the turning operation, the divisor register is continually updated. As the cutting tool moves closer to the center of revolution of the workpiece, the divisor number decreases and the spindle speed increases to hold the surface cutting speed constant at the commanded value. Conversely, increases in cutting radius will slow down the spindle speed. Thus, this control circuit can be considered an adaptive control circuit in that one parameter (surface cutting speed) is maintained constant despite changes in another related parameter (cutting radius). Constant revolutions per minute operation is obtained from this basic constant surface feet per minute circuit by simply inserting and maintaining a constant number in the divisor register. A convenient number is the radius equivalent to one foot of circumference which permits the revolutions per minute command to have the same numerical range as the surface feet per minute commands.

If the input pulse rate 17 has a pulse rate whose frequency represents a constant surface feet per minute command, the multiplier/divisor circuit of FIG. 1 may be used with some fixed minimum radius in the multiplier register and the variable cutting radius in the divisor register. Then, for all cutting radii greater than said fixed minimum radius, the output pulse rate 610 will be less than the input pulse rate and of such value as to command a spindle speed which results in the desired surface feet per minute cutting speed at the cutting tool. For cutting radii less than said fixed minimum radius, the circuit can be designed to make the output pulse rate equal to the input pulse rate thereby resulting in some fixed maximum spindle speed. This application of the invention can also be programmed for constant revolutions per minute operation by fixing the number in the divisor register at said fixed minimum radius or some multiple thereof.

In one form of spindle speed control, the pulses to the spindle motor control circuit 50 consist of a pulse width modulated signal occurring at a constant pulse rate but with a pulse width which varies proportional to the desired command in revolutions per minute. This in itself is a complete operational control for constant revolution per minute operation. For operation as a constant surface feet per minute control, the surface feet per minute command is used to set the pulse width and additional control is exercised on rate of application of such pulses to the output circuit 50 in accordance to the ratio of some fixed minimum radius to the actual cutting radius. This latter function is accomplished by generating input pulse 17 for each pulse width command pulse. For this mode of operation, switch S is moved to connect with pulse input lead 17. The fixed minimum radius is inserted in the multiplier register of FIG. 1, and the actual cutting radius is inserted into and maintained in the divisor register of FIG. 1. The output signal 61 from flip-flop 60 is then applied as a gate signal to AND gate 62 to permit said pulse width modulated signal on lead 63 to be applied to the input of the output circuit 50. Thus, this multiplier/divisor circuit is utilized to apply a second, namely pulse rate modulation, onto a pulse signal previously pulse width modulated. When such a control is employed, it may be programmed directly in surface feet per minute. In such a case, the pulse width modulated signal would be further modulated in accordance with the cutting radius by an on-off modulation of whole pulses in the pulse width modulated signal train. Adaptive control modulation is performed in this way and the multiplier/divide circuit can be employed to control the on-off modulation of the pulse width signal.

It should be noted that dimensions in the specification and claims may be recited in terms of specific measurement units and scaling. However, where such terminology is used, it is intended to cover other units of measurement and other scaling factors.

A particular embodiment of the present invention has been shown. It will be appreciated that those skilled in the art will see further modifications and developments as a result of the teachings herein. All such modifications as come within the appended claims are intended to be covered thereby.

What I claim as new and desire to secure by Letters Patent of the United States is:

1. The method of producing a number of output pulses related to an input pulse train in accordance with the ratio of a first number stored in a first register to a second number stored in a second register comprising:

a. storing a third number in a third register;

b. subtracting with circuit means the number in the first register from the number in the third register upon occurrence of each input pulse, and then storing the remainder of said subtraction in the third register;

c. adding with circuit means the number in the second register to the number in the third register when the third number is below a predetermined value, and then storing the sum of said addition in the third register; and d. producing an output pulse each time the third number is below said predetermined value.

2. The method defined in claim 1, wherein said output pulse is used to initiate the addition step.

3. The method defined in claim 1, wherein said numbers are stored in binary numerical form, said method including generation of a repetitive control signal for establishing a repetitive sequence of the various steps and being effective to enable the respective adding and subtracting operations.

4. A pulse rate multiply/divide circuit for producing a number of output pulses related to an input pulse train in accordance with the ratio of first and second quantities, comprising first storage means (10) registering a first number representing said first quantity, second storage means (20) registering a second number representing said second quantity, third storage means (30) registering a third number, arithmetic means (40) selectively operative to subtract said first number from the number registered in said third storage means upon occurrence of each input pulse, and coupled to said third storage means to thereafter register the remainder therein, said arithmetic means (40) being further operative when the number stored in said third storage means is below a predetermined value, to add said second number thereto and thereafter register the sum in said third storage means, and output means (31 or 60) for producing an output pulse each time the number registered in said third storage means (30) is below said predetermined value.

5. A pulse rate multiply/divide circuit as defined in claim 4, wherein said third storage means comprises an accumulator register (30) coupled to said arithmetic means (40) and operative to supply data thereto and receive data therefrom, representing said third quantity; and wherein said arithmetic means comprises addition and subtraction means selectively operative in accordance with the state of an input control signal (160).

6. A pulse rate multiply/divide circuit as defined in claim 5, including independent logic gating means (12,22) connected between said first and second storage means and said arithmetic means (40), one of said logic gating means (12) being enabled under joint control of said input control signal (160) and said input pulse (170) and the other of said logic gating means (22) being enabled under the joint control of said input control signal (160) and a control signal (610) generated when the number in the accumulator is below said predetermined value.

7. A pulse rate multiply/divide circuit as defined in claim 6, in combination with means (50) responsive to said output pulses to control motion of a mechanical device.

8. A system for controlling the spindle speed of a turning machine tool comprising a source of input pulses of repetition rate P, an accumulator register, a divisor register, a multiplier register, means for inserting a number S in said multiplier register representing the desired surface feet per minute of cutting speed, means for inserting and maintaining in said divisor register a number R representing the actual cutting radius of said tool, means maintaining the cutting speed constant during changes in said cutting radius comprising means for converting said input pulses into output pulses where the output pulses have a repetition rate $p$ where $p = S\ P/R$, said last-named means comprising means for subtracting the value of $S$ from the number stored in the accumulator register for each input pulse to provide a new remainder in said accumulator register, and only in the event the new remainder is below a predetermined value adding the value of $R$ to said new remainder to provide a new sum in said accumulator register and producing an output pulse, and means for controlling the speed of said spindle as a function of the repetition rate of said output pulses.

9. A system for controlling the spindle speed of a turning machine tool comprising a source of input pulses of repetition rate P, an accumulator register, a divisor register, a multiplier register, means for inserting a number $M$ in said multiplier register representing the desired revolutions per minute of spindle speed, means for inserting and maintaining in said divisor register a constant number $R_1$ representing a radius equal to one foot of circumference and maintaining the spindle speed constant independent of changes in the actual cutting radius comprising means for converting said input pulses into output pulses where the output pulses have a repetition rate $p$ where $p = M\ P/R_1$, said last-named means comprising means for subtracting the value of $M$ from the number stored in the accumulator register for each input pulse to provide a new remainder in said accumulator register, and only in the event the new remainder is below a predetermined value adding the value of $R_1$ to said new remainder to provide a new sum in said accumulator register and producing an output pulse, and means for controlling the speed of said spindle as a function of the repetition rate of said output pulses.

10. A system for controlling the spindle speed of a turning machine tool comprising a source of input pulses of repetition rate $P$ representing the desired surface feet per minute of cutting speed, an accumulator register, a divisor register, a multiplier register, means for inserting a number $N_1$ in said multiplier register representing a fixed, minimum cutting radius, means for inserting and maintaining in said divisor register a number $N_2$ representing the actual cutting radius of said tool, means maintaining the cutting speed constant during changes in said cutting radius comprising means for converting said input pulses into output pulses where the output pulses have a repetition rate $p$ where $p = N_1\ P/N_2$, said last-named means comprising means for subtracting the value of $N_1$ from the number stored in the accumulator register for each input pulse to provide a new remainder in said accumulator register, and only in the event the new remainder is below a predetermined value adding the value of $N_2$ to said new remainder to provide a new sum in said accumulator register and producing an output pulse, and means for controlling the speed of said spindle as a function of the repetition rate of said output pulses.

11. A system for controlling the spindle speed of a turning machine tool comprising a source of input pulses of constant repetition rate $P$ and having a pulse width modulation representing the desired surface feet per minute of cutting speed, an accumulator register, a divisor register, a multiplier register, means for inserting a number $N_1$ in said multiplier register representing a fixed, minimum cutting radius, means for inserting and maintaining in said divisor register a number $N_2$ representing the actual cutting radius of said tool, means maintaining the cutting speed constant during changes in said cutting radius comprising means for converting said input pulses into output pulses where the output pulses have a repetition rate $p$ where $p = N_1 P/N_2$, said last-named means comprising means for subtracting the value of $N_1$ from the number stored in the accumulator register for each input pulse to provide a new remainder in said accumulator register, and only in the event the new remainder is below a predetermined value adding the value of $N_2$ to said new remainder to provide a new sum in said accumulator register and producing an output pulse, means responsive to gated input pulses for controlling the speed of said spindle as a function of said pulse width modulation, and means for gating input pulses in response to output pulses to provide said gated input pulses.

12. A system for controlling the speed of machine comprising a source of input pulses of repetition rate $P$, an accumulator register, a divisor register, a multiplier register, means for inserting a number $N_1$ in said multiplier register representing a first machine speed characteristic, means for inserting and maintaining in said divisor register a number $N_2$ representing a second machine speed characteristic, means for converting said input pulses into output pulses where the output pulses have a repetition rate $p$ where $p = N_1 P/N_2$, said last-named means comprising means for subtracting the value of $N_1$ from the number stored in the accumulator register for each input pulse to provide a new remainder in said accumulator register, and only in the event the new remainder is below a predetermined value adding the value of $N_2$ to said new remainder to provide a new sum in said accumulator register and producing an output pulse, and means for controlling the speed of said machine as a function of the repetition rate of said output pulses.

* * * * *